H. N. CARRAGHER.
LOCKING DEVICE FOR DETACHABLY SECURING A RIM TO THE FELLY OF A WHEEL.
APPLICATION FILED MAR. 20, 1911.
1,020,126.
Patented Mar. 12, 1912.
2 SHEETS—SHEET 1.
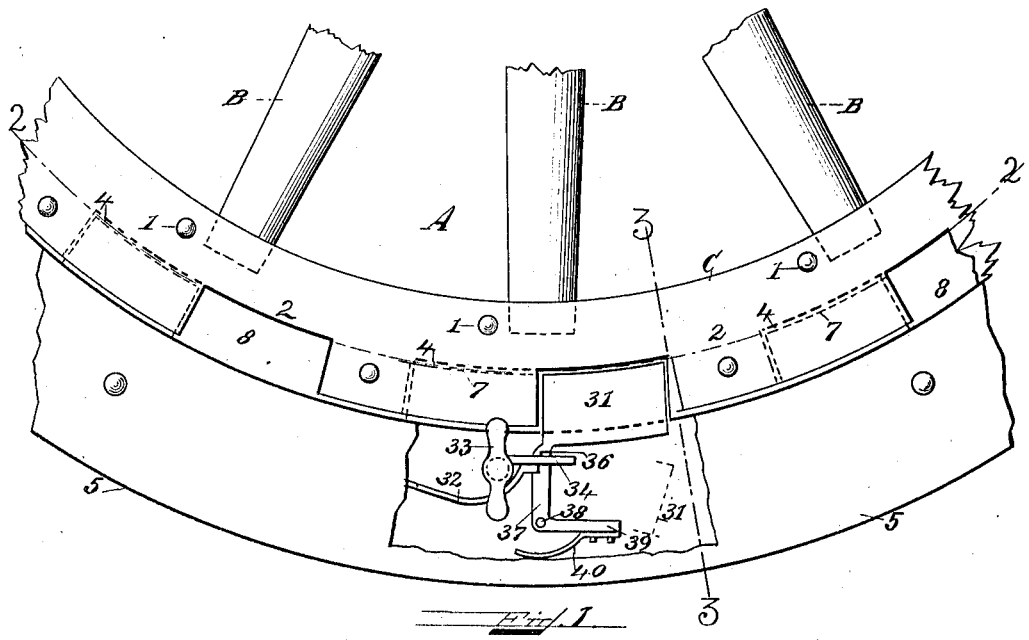
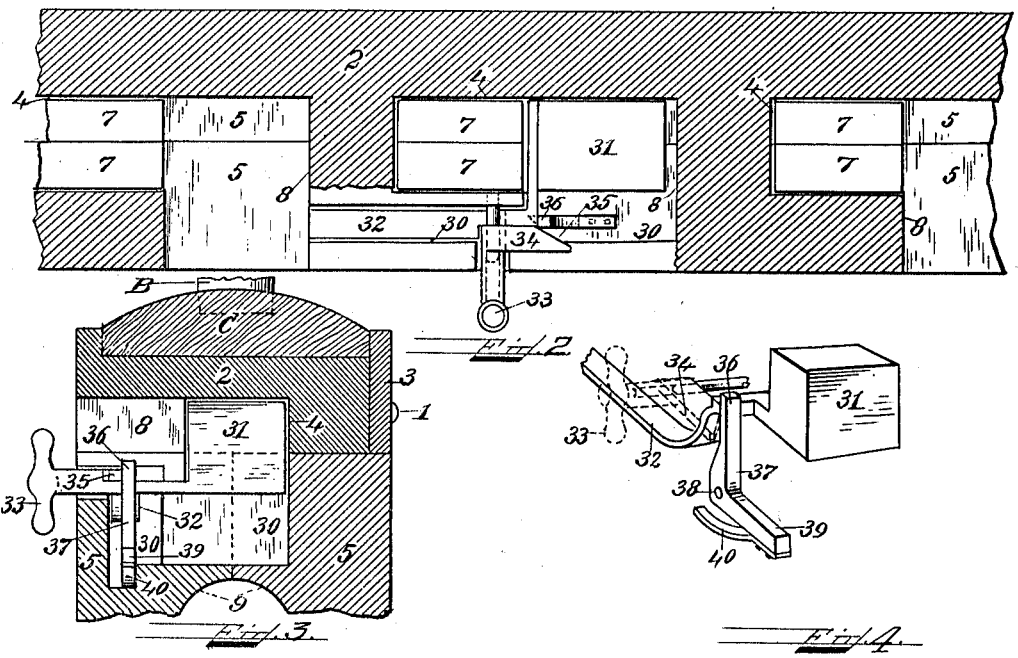

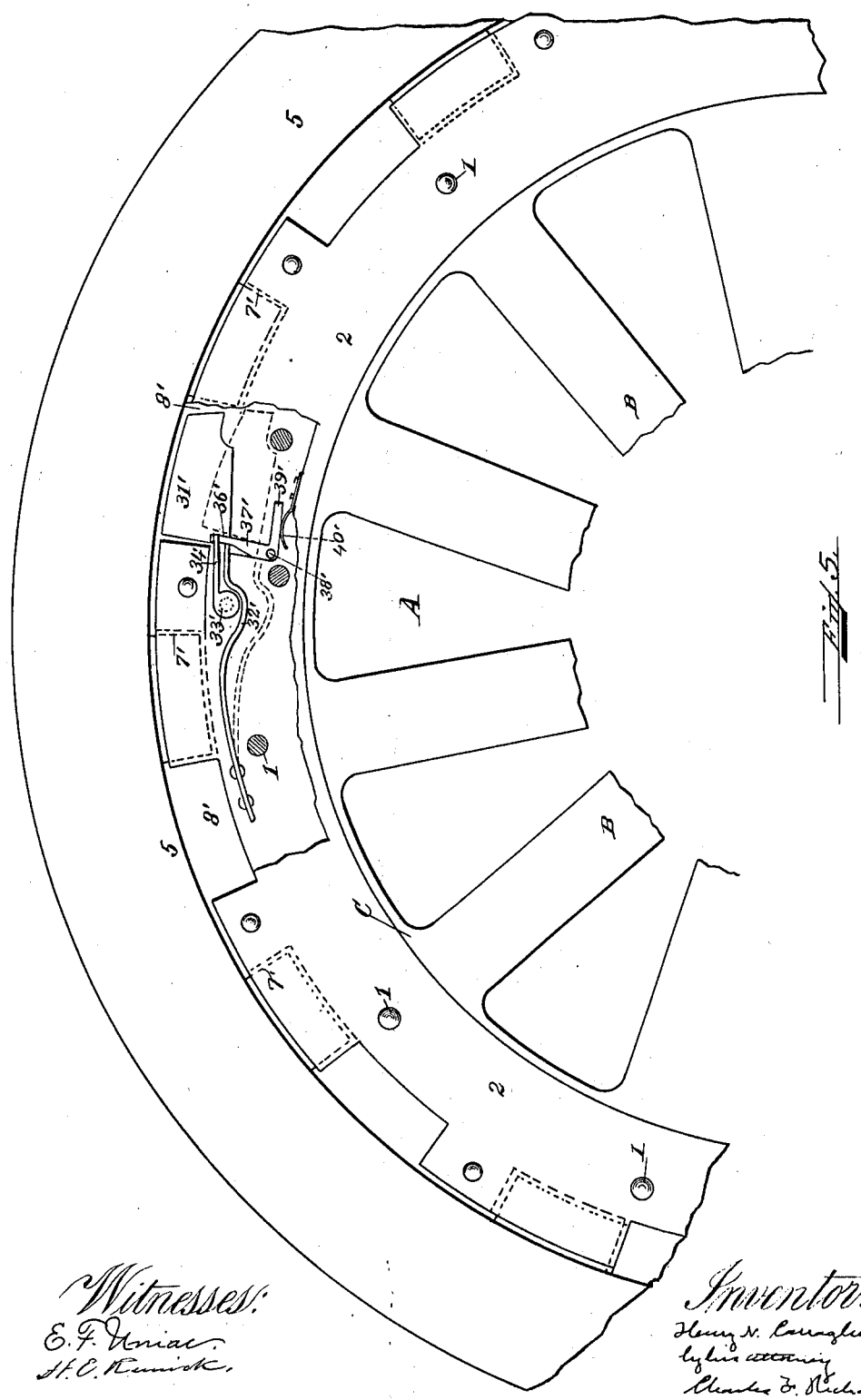

UNITED STATES PATENT OFFICE.

HENRY N. CARRAGHER, OF FALL RIVER, MASSACHUSETTS.

LOCKING DEVICE FOR DETACHABLY SECURING A RIM TO THE FELLY OF A WHEEL.

1,020,126.

Specification of Letters Patent. Patented Mar. 12, 1912.

Application filed March 20, 1911. Serial No. 615,723.

*To all whom it may concern:*

Be it known that I, HENRY N. CARRAGHER, a citizen of the United States, residing at Fall River, in the county of Bristol and State of Massachusetts, have invented a certain new and useful Locking Device for Detachably Securing a Rim to the Felly of a Wheel, of which the following is a specification, reference being had therein to the accompanying drawings.

The object of my invention is to provide suitable means for locking and unlocking an auxiliary rim to and from the felly of a wheel, such, for example, as is shown and described in patent application, filed by me February 15th, 1910, Serial No. 544,001, to which reference may be had for further description and illustration of the environment of this feature of my invention.

In the drawings illustrating the principle of my invention, and the best method now known to me of embodying the same in operative structure, Figure 1 is a side elevation of a fragment of a wheel in part broken away, to disclose my invention. Fig. 2 is a sectional plan, on line 2—2 in Fig. 1, a portion being broken away to show a portion of the lock-spring. Fig. 3 is a transverse section, on line 3—3, in Fig. 1. Fig. 4 is a detail of the locking mechanism, in perspective. Fig. 5 is a side elevation of a fragment of a wheel, in part broken away to disclose a modification of my locking mechanism, which is here shown as mounted in the main rim of the wheel, rather than in the auxiliary rim, as shown in the preceding figures.

A wheel A, provided with spokes B, has a felly C. To the latter, by means of a bolt 1, Fig. 3, is bolted a metal rim consisting of two parts, 2, 3, having a series of intermittent grooves, 4, 4, Figs. 1, 2 and 3, in its outer circumference. On this metal rim or main rim 2 is fitted a detachable auxiliary metal rim of two like parts 5, 5, having on their inner circumferential surfaces bosses or studs 7, 7, to be fitted and locked into the series of intermittent grooves 4, 4, in the main rim. These grooves are accessible from the side of the main rim, by side openings 8, Figs. 1, 2 and 3, through which, in mounting the auxiliary rim, the bosses may be moved into the plane of the intermittent grooves in the main rim.

Symmetrically cut in the outer adjacent parts of the like parts 5, 5, of the auxiliary rim, is a common lock slot 9 into which a lock portion of an air cushion 11 may be inserted and gripped between the sides of the slot 9, by tightening suitable bolts and nuts; but this method of securing the tire between the parts 5, 5, constitutes no part of the locking mechanism.

To lock the auxiliary rim 5, 5, to the main rim 2 of the wheel, there is pivotally mounted in a cavity 30 in the auxiliary rim 5, a stud 31 which is supported on a spring 32, and occupies the space of one of the series of bosses, vacated when they are turned into engagement with the corresponding series of grooves 4, 4, in the main rim.

To unlock the auxiliary rim 5 from the main rim 2, a key 33 is used. It has a fin 34 with an edge 35, inclined to the axis of the key, and when the key is pushed into its hole in the auxiliary rim, the inclined edge 35 of the fin 34 engages the notched end 36 of a bell crank lever 37 which is fulcrumed at 38, and engages a portion of the spring 32 of the stud which is thereby held in normal position in one of the grooves 4 in the main rim. By pushing the key inward, the inclined edge of the fin forces the notched end 36 of the lever out of engagement with the spring 32; and then, by turning the key, see Fig. 1, the fin acts against the spring 32, and the freed stud 31 is, as indicated in dotted lines, forced down and out of the groove, after which time, the auxiliary rim and the main rim may, in relation to each other in the same plane, be moved until the bosses 7, 7, are opposite the side openings 8, 8, of grooves 4, 4; then the bosses can be moved outward through the side openings 8, 8, and the auxiliary rim and parts connected thereto, be, as a unit, detached from the main rim of the wheel. To the other arm 39 of the bell crank lever is operatively secured a spring 40 which tends to hold the bell crank lever in position for its notched end 36 to seize and hold the movable stud 31 in its normal position.

The construction and operation of the modified form of the locking device shown in Fig. 5 are substantially the same as those already explained; the only actual difference in construction being that the locking mechanism is mounted in the main rim, rather than in the auxiliary rim; the form of the various parts, as the stud 31' and the spring 32', being modified to adapt them to their reversed environment.

Desiring to protect my invention in the broadest manner legally possible, what I claim is:—

1. A wheel rim; a series of intermittent grooves in its outer circumference; openings leading from the side of the rim into said grooves; an auxiliary rim provided on its inner circumference with a series of bosses adapted to be moved through said openings and then twisted into locking engagement with said grooves; a stud formed to occupy the space vacated by one of said bosses when it is moved into engagement with its respective groove; said boss and said stud practically filling the latter groove and thus preventing circumferential slipping between the main rim and the auxiliary rim; a spring mounted in a cavity in the auxiliary rim and having the said stud connected therewith, said spring tending to move the stud out of the cavity and to hold the stud in locking engagement with its boss and the wheel rim; a lock arm to engage a shoulder on said stud, and lock the latter in locking position; a spring to hold the lock arm in locking position; said stud and said lock arm being designed to be operated by suitable means to disengage the lock arm from the shoulder of the stud, and to force the stud out of said groove and into its cavity to permit the boss to be moved in said groove, circumferentially in relation to the rim, and then outwardly through the said side opening for said boss.

2. A wheel rim; an auxiliary rim; a series of intermittent grooves in the circumference of one of said rims, and openings leading from the side of the rim into the said grooves; a series of bosses in the circumference of the other of said rims, and adapted to be moved through said openings and then twisted into locking engagement with said grooves; a stud formed to occupy the space vacated by one of said bosses when it is moved into engagement with its respective groove; said boss and said stud practically filling the latter groove and thus preventing circumferential slipping between the main rim and the auxiliary rim; a spring mounted in a cavity in one of said rims and having the said stud connected therewith, said spring tending to move the stud out of the cavity and to hold the stud in locking engagement with its boss and groove; a lock arm to engage a shoulder on said stud and lock the latter in locking position; and a spring to hold the lock arm in locking position; said stud and said lock arm being designed to be operated by suitable means to disengage the lock arm from the shoulder of the stud and to force the stud out of said groove and into its cavity to permit the boss to be moved in said groove circumferentially and then outwardly through said side opening for said boss.

In testimony whereof I affix my signature in presence of two witnesses.

HENRY N. CARRAGHER.

Witnesses:
RICHARD P. BORDEN,
LODIVINE LEMOINE.

Copies of this patent may be obtained for five cents each, by addressing the "Commissioner of Patents, Washington, D. C."